Feb. 21, 1956          W. T. HONISS          2,735,229
FOREHEARTH HIGH EFFICIENCY COOLING SECTION
Filed June 24, 1954          2 Sheets-Sheet 1
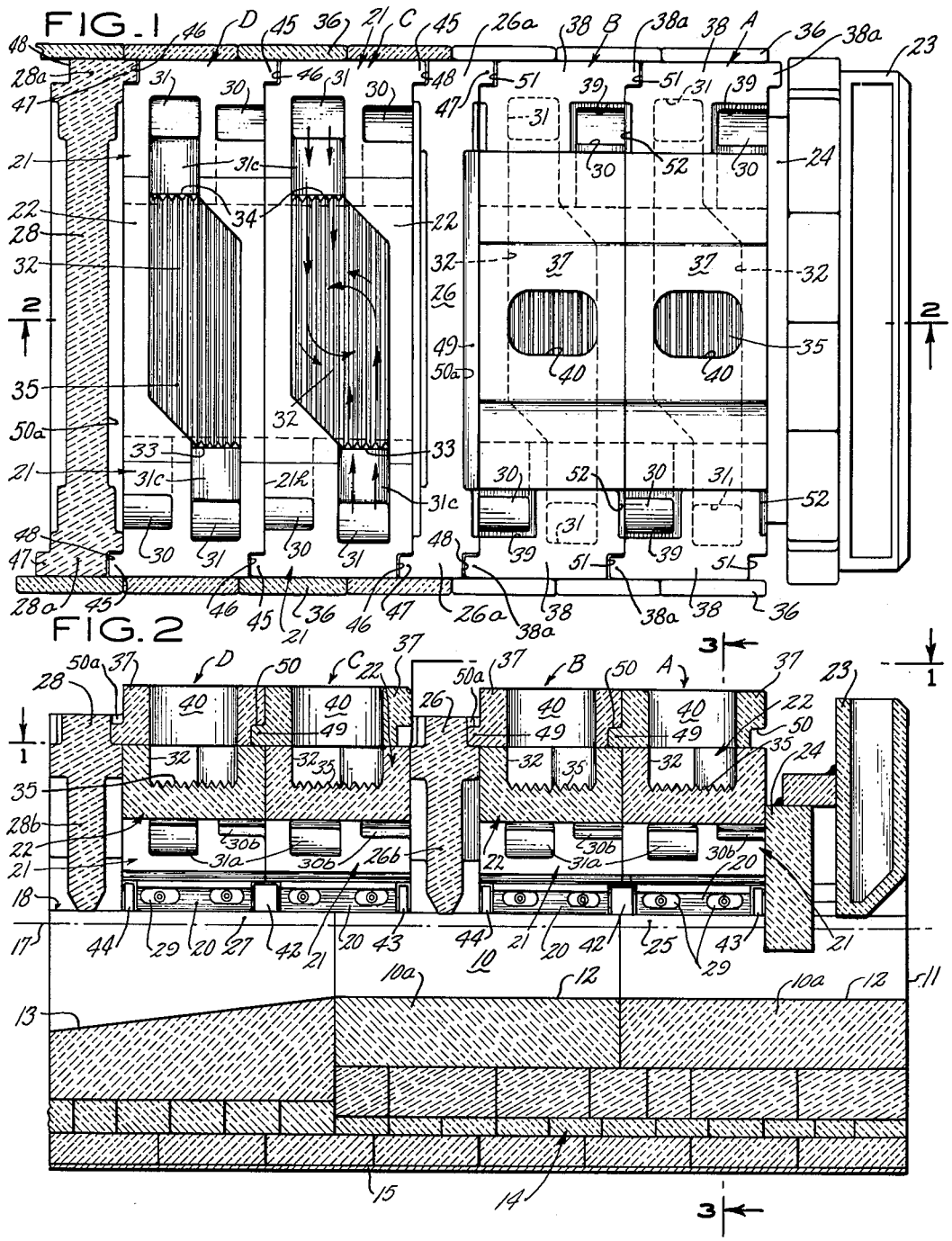
INVENTOR
WILLIAM T. HONISS
BY Bates + Willard
ATTORNEYS Feb. 21, 1956  W. T. HONISS  2,735,229
FOREHEARTH HIGH EFFICIENCY COOLING SECTION
Filed June 24, 1954  2 Sheets-Sheet 2

INVENTOR
WILLIAM T. HONISS
BY Bates & Willard
ATTORNEYS

United States Patent Office 2,735,229
Patented Feb. 21, 1956

2,735,229
FOREHEARTH HIGH EFFICIENCY COOLING SECTION

William T. Honiss, West Hartford, Conn., assignor to Emhart Manufacturing Company, Hartford, Conn., a corporation of Delaware Application June 24, 1954, Serial No. 439,064

15 Claims. (Cl. 49—54)

This invention relates generally to improvements in molten glass feeder forehearths and more particularly to improvements in the cooling section thereof.

A glass feeder forehearth is an elongate, generally horizontal, covered refractory channel structure projecting from the nose of a glass melting tank furnace with which it is operatively connected so that molten glass from the furnace flows in a continuous stream from the furnace through the forehearth channel structure to a feed spout or basin which forms the outer end portion of the forehearth and from which molten glass is fed in mold charges, gathered or otherwise removed.

The temperature of the glass passing from the supply furnace into the forehearth usually is higher than that desired for the glass to be fed or otherwise removed from the outer or delivery end portion of such forehearth. The temperature regulation of the glass during its travel through the initial portion of the forehearth channel therefore is mainly by cooling and this portion of the forehearth customarily is termed its cooling section.

Since the glass moving from a melting tank or like source of supply through the forehearth to the delivery chamber tends to become cooler and to flow more slowly next to the walls of the forehearth channel, it is usual to provide some means in an attempt to bring the temperature and rate of flow of the side or edge portions of the stream and of the remainder of the stream into substantial correspondence. Such means may comprise means for permitting cooling of the middle portion of the glass, as by radiation through the top wall of the cooling section of the forehearth while heat loss from the glass of the side or edge portions of the stream is substantially reduced or opposed, as by the application of heat thereto.

The reduction of temperature to be effected may be relatively slight, as when the glass to be fed or otherwise removed is to be at a relatively high temperature, suitable for the production of small charges which are to be manufactured into small articles of glassware. When the charges are relatively large, as for the manufacture of larger articles of glassware, the reduction of temperature is greater and may be as much as 300 to 400 degrees greater than the reduction required for charges for small ware. Also, the temperature of the glass entering the forehearth may be different in different installations and even at different times in the same installation. Still further, the factors governing the condition of the glass will be different when the output of glass from the delivery chamber per unit of time is varied, even though there has been no change of temperature in the glass entering the forehearth and the same temperature is desired at the feed outlet or point of delivery of glass from the delivery chamber.

An object of the present invention is to provide greater efficiency and economy in the use of cooling air and/or heating gases to regulate the temperature of molten glass in the cooling section of a forehearth of the character described.

A further object of the invention is to provide a substantial increase in the cooling capacity per foot of length of the cooling section of a forehearth of the character described.

A further object of the invention is to provide a novel construction and arrangement of forehearth cooling section roof blocks such that cooling wind applied to the cooling section is caused to scrub against both the under and upper surfaces of the roof blocks, thus making for efficient cooling, and when no cooling wind is being used, fire from burners located at the sides of the forehearth cooling section will pass against both such surfaces of the roof blocks, whereby to increase the firing efficiency of the burners.

Another object of the invention is to provide for practically independent regulations of temperature of the glass in a plurality of successive zones through which a stream of the glass flows in passing through the cooling section of a forehearth of the character described, whereby one such zone can be used for heating the portion of the glass stream in that zone, as to an extent sufficient to prevent any substantial reduction in the temperature of the bottom glass of that portion of the stream, while the succeeding zone can be used for intensive cooling of the top glass of the stream or any other selected sequence of selected heating and/or cooling treatments of the glass in the successive zones can be employed as deemed best to bring about a condition of substantial uniformity of temperature throughout the cross-section of the glass stream and the proper temperature in the glass at the spout.

A further object of the invention is to provide a forehearth cooling section having a claywork superstructure constructed and arranged to prevent or minimize loss of heat from and indrafts of air to the interior thereof at joints between refractory components of such superstructure.

A further object of the invention is to provide a forehearth cooling section claywork superstructure comprising but relatively few component blocks of such shapes, sizes, relative arrangement and manner of support that the burner blocks of such cooling section are relieved at their relatively hot inner ends of the weight of such superstructure, whereby the life of the burner blocks in service will be substantially lengthened.

Another object of the invention is to provide effective baffling of cooling wind from the inner ends of the forehearth cooling section burner ports when cooling wind is being introduced into the cooling section and also to prevent passage of flames and heated gases from the burner ports to the cooling wind ports when the burners are being used and the cooling wind ports are inactive.

Other objects and advantages of the invention will hereinafter be pointed out or will become obvious from the following description of a practical embodiment of the invention as shown in the accompanying drawings, in which:

Fig. 1 is a plan of a forehearth cooling section of the present invention at a plane indicated by the line 1—1 of Fig. 2, part of the structure being in section;

Fig. 2 is a longitudinal vertical section of the forehearth cooling section at the vertical plane indicated by the line 2—2 of Fig. 1;

Figure 3:
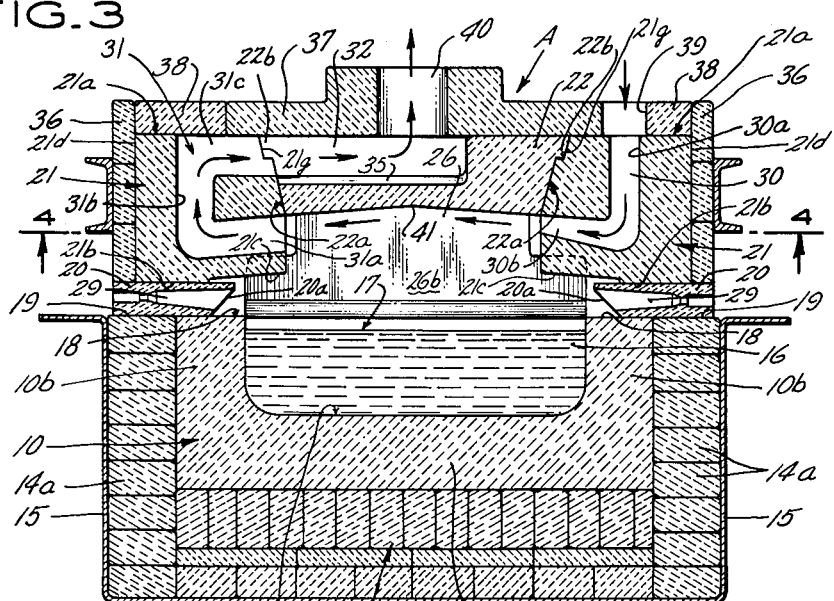
Fig. 3 is a transverse vertical section on line 3—3 of Fig. 2.

The forehearth cooling section includes a portion, generally designated 10, of a generally horizontal refractory channel adapted to accommodate a stream of molten glass. The portion 10 extends from the rear or receiving end of such channel, indicated at 11 in Fig. 2, for a predetermined portion of the length of the complete channel. Such channel portion comprises a bottom 10a provided with upwardly turned parallel glass retaining side walls 10b. The upper surface of channel bottom 10a may be substantially level as indicated at 12 in Fig. 2 from its rear end for part of its length and then may slope downwardly and forwardly as indicated at 13 in the same view.

Channel portion 10, which is U-shaped in cross-sectional configuration, may rest in a bed 14 of heat insulating material having side portions 14a extending upwardly against the side walls 10b of the refractory channel to the top of the latter. This bed of heat insulating material is confined within and supported by a U-shaped metallic casing 15 and may consist of suitably arranged suitable insulating brick as in the example shown. The metallic casing 15 may be supported by suitable supporting structure, not shown, so that molten glass from a melting furnace or other source of supply, not shown, will enter the refractory channel 10 at its rear end 11. The arrangement is such that a stream of molten glass, indicated at 16, in Fig. 3, will fill the channel portion 10 to a level therein which, as indicated at 17 in Figs. 2 and 3, may be only slightly below the plane of the upper surfaces 18 of the side walls 10b of the glass holding refractory channel 10. The upper surfaces, indicated at 19 in Fig. 3 of the side wall portions 14a of the heat insulating bed 14 may be in the same horizontal plane as the upper surfaces 18 of refractory channel side walls 10b so that relatively wide horizontal supporting surfaces will be provided at opposite sides of the glass flow channel for support of the claywork superstructure of the forehearth cooling section.

According to the present invention, the claywork superstructure comprises a predetermined number of identical transverse sections. The example shown comprises four such transverse sections, these being designated A, B, C and D, respectively in Figs. 1 and 2. As shown for section A in Fig. 3, each such section comprises a pair of burner blocks 20 which respectively rest on the supporting surfaces 18—19 at opposite sides of the channel and in aligned opposing relation to each other. Superimposed on each of these burner blocks 20 is a combination refractory skewback and arch springer block 21, there being two of these blocks 21, respectively, disposed at opposite sides of the forehearth cooling section in confronting relation to each other. A refractory key block 22 fits between the upper portions of the opposed blocks 21 and together with these latter blocks forms a transverse roof section over a portion of the glass stream in the forehearth cooling section. In the example shown, the glass stream enters the rear end of the refractory channel 10 beneath a transversely extending mantle block 23 with which a transversely disposed refractory skimmer block 24 is associated in a known manner. This skimmer block depends in part in a forehearth glass flow channel to a level below the surface of the glass stream therein.

On passing under skimmer block 24, the glass stream is in a rear temperature regulating chamber or zone 25 which is provided by the installation of the transverse claywork superstructure sections A and B between the skimmer block 24 and a transverse baffle block 26. A second and more forwardly located temperature regulating chamber 27 is provided by the installation of the transverse claywork superstructure sections C and D between the transverse baffle block 26 and a similar, more forwardly located transverse baffle block 28, all as best seen in Fig. 2.

The transverse baffle blocks 26 and 28 have their opposite end portions, indicated at 26a—26a and 28a—28a, respectively, disposed on the upper surfaces 18—19, of the refractory channel side walls 10b and contiguous side portions 14a of the channel insulating bed. Each baffle member 26 or 28 has a panel portion 26b or 28b of relatively reduced thickness spanning the space across the forehearth cooling section above the stream of glass therein and depending nearly to the surface of such glass. The temperature regulating chambers 25 and 27 thus are practically separated from each other and the temperatures of the portions of the glass stream passing in the refractory channel beneath such chambers may be given different regulatory treatments as presently will be explained.

Each burner block 20 is formed with a pair of burner ports or tunnels 29 extending therethrough from its outer face to its inner face. Each such burner port or tunnel may be formed to widen toward its discharge end for effective spread of flames and heated products of combustion. The burner blocks may be undercut on angle as indicated at 20a, Fig. 3, so as to assure effective heating of the inner edge portions of the refractory channel side walls and of the portions of the glass stream adjacent to these side walls.

Each of the combination springer and skewback blocks 21 has a substantially flat top surface 21a. Its bottom surface is flat as indicated at 21b so as to be parallel with the top surface for approximately half the distance from the outer surface to the inner surface of such block. The remainder of the bottom surface of block 21, indicated at 21c, is upwardly inclined so as to diverge slightly from the plane of bottom portion 21b. The outer surface, indicated at 21d, of the block may be perpendicular to the planes of the flat top surface 21a and bottom partial surface 21b. The inner face of block 21 comprises a lower portion, 21e, which may be approximately parallel with the outer surface 21d and hence perpendicular to the plane of the outer bottom surface portion 21b, and an inclined upper portion, 21f, the slope of which matches that of the abutting end surface, 22a, of the key block 22. It may be noted in this connection that the ends of key block 22 are formed with projecting upper portions 22b and that the blocks 21 are cut back or recessed at the top of their inner faces as indicated at 21g to fit the projecting portions 22b of key block 22.

Figure 5:
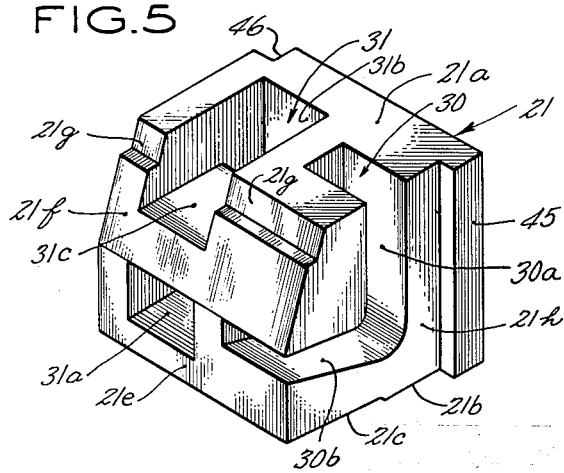
Fig. 5 is a perspective view of one of the special combination arch springer and skewback blocks included in the claywork superstructure of the forehearth cooling section.

Each block 21 is formed with a cooling air inlet passage 30 in the form of a general L-shaped groove in one side, 21h, thereof. The initial portion of this groove extends downwardly as indicated at 30a from the upper surface 21a of the block toward but not to the bottom surface. The groove then turns at nearly a right angle and extends as indicated at 30b toward and through the lower portion 21e of the inner face of the block. See Fig. 5 and the right hand block 21 in Fig. 3. A generally C-shaped air outlet passage 31 also is formed in the block 21 in side-by-side relation with inlet passage 30 and comprises an initial portion 31a extending from the lower portion 21e of the inner face of the block part way through such block toward its outer surface, an upwardly turned portion 31b and an inwardly returning upper portion 31c in the form of a groove provided in the top of the block to open through the upper portion 21f of the inner surface of the block. See Fig. 5 and the left hand block 21 in Fig. 3.

The middle or key block 22 is formed with a cavity 32 in its top provided at its opposite ends with entrance grooves 33 and 34, respectively, these grooves being narrower extensions of the cavity next to diagonally opposite corners thereof and opening through the upper portions of end faces 22a of the block. The bottom of cavity 32 may be corrugated as indicated at 35, Fig. 1, or otherwise roughened. The entrance groove 33 at one end of cavity 32 registers with the open end of upper portion 31c of the air outlet passage 31 of one of the two blocks 21 of a transverse roof section while the entrance groove 34 at the opposite end of such cavity similarly registers with the open end of upper portion 31c of the air outlet passage 31 in the block 21 at the opposite end of the roof section. Such roof section may be insulated at the outer sides of blocks 21 by suitable insulating brick 36 and covered by a middle roof cover block 37 and similar end roof cover blocks 38. Each block 38 may be partially cut away or deeply notched at one of its inner corner portions at 39 to provide a port over the underlying upper end of portion 30a of a cooling air inlet passage 30. Middle cover block 37 is provided with a final outlet or stack opening 40 which is located over the approximate central portion of cavity 32 in the underlying key block 22.

Figure 4:
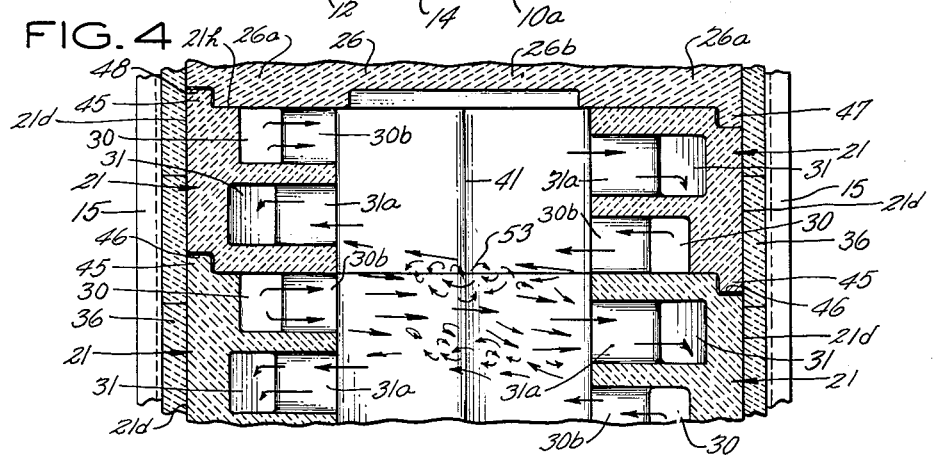
Fig. 4 is a partial plan section looking upward at the plane indicated by the line 4—4 of Fig. 3.

The under surface of key block 22 may be slightly convex in transverse curvature as indicated at 41, Figs. 3 and 4.

A refractory filler block 42 may be placed as indicated in Fig. 2 in the gap between adjacent burner blocks 20 at a side of each of the chambers 25 and 27. Other refractory filler blocks as indicated at 43 and 44, respectively, may be placed between the remote sides of such burner blocks and the adjacent transverse baffle or partition members. If desired, certain of these filler blocks may be omitted or removed to permit observation of conditions within the temperature regulating chambers.

The abutting block components of the superstructure provided according to the present invention preferably have overlapping portions to prevent or minimize leakage at the joints of heat from the temperature-regulating chambers or infiltration of air from the ambient atmosphere to these chambers. Thus, each block 21 is provided with a projecting vertical rib portion 45 on one side thereof adjacent to the outer surface of the block and with a similarly located vertical recess, indicated at 46, in its opposite side adapted to receive the rib 45 or other similar projection on an abutting block 21 or other abutting refractory element. See Figs. 1 and 4. One of the end portions 26a of the baffle 26 is provided on its forward side with a projecting vertical rib 47 which fits in the vertical notch 46 of adjacent block 21. This same end 26a of the baffle member 26 is provided on its rearward side with a vertical notch 48 for the vertical rib 45 of the adjacent block 21. At the opposite end of baffle 26 the situation is reversed in that the vertical notch 48 is provided in the forward side of that end portion of the baffle and the projecting vertical rib 47 is on the rearward side thereof.

The baffle member 28 is identical with the baffle member 26 and each end portion 28a thereof thus has one of the vertical ribs 47 on one side thereof for the vertical notch 46 of the adjacent block 21 and one of the vertical notches 48 in its opposite side for the vertical rib 45 of block 21.

The middle roof cover blocks 37 are formed with projecting horizontal sealing ribs 49 at their forward edges and with rearwardly facing horizontal recesses 50 in their rearward edges. The rib 49 of the more forwardly located of the two blocks 37 above each of the chambers 25 and 27 fits in a horizontal notch or groove 50a in the adjacent side of the upper portion of the adjacent transverse baffle member 26 or 28.

Each of the end roof cover blocks 38 is formed with a laterally projecting portion 38a at one of its outer corner portions and with a notch 51 in its opposite outer corner portion. Each such end cover block also may be cut away slightly, as at 52, at its inner corner portion opposite the cutaway portion 39. When two of the blocks 38 are arranged in abutting relation at each of the opposite ends of the transverse superstructure above one of the temperature regulating chambers, as above the chamber 25 as shown in the right hand portion of Fig. 1, the projection 38a of one of such blocks will fit in the notch 51 of the abutting block and the cutaway portion 52 of one will complement cutaway portion 39 of the abutting block to define the air intake port at the upper end of air intake passage 30.

Each cooling air intake passage 30 may be operatively connected at its port in the cover structure with a suitable source of supply of cooling air under pressure, none being shown. When the cooling air, generally termed "cooling wind," is being used it will pass as indicated by direction arrows in Fig. 3 through the passage 30 and thence transversely across the under surface of key block 22 to the intake end 31a of the outlet passage 31 in the opposite block 21. In passing across the lower surface of the roof block 22, the jets or currents of cooling wind must move slightly to the rear or forwardly since the intake end of passage 31 is slightly out of line with the discharge end of passage 30. It will be noted in this connection that discharge portion 30b of the cooling wind inlet passage may have a slight "choke" and also that its bottom is inclined slightly toward the roof so that the jets or currents of cooling wind are caused to scrub across the under surface of block 22. The under surface of this block is arched slightly and there will be some interference between marginal portions of oppositely moving jets or streams of cooling air scrubbing against the undersurface of the block and opposing each other, thus producing some turbulence as indicated at 53 in Fig. 4 at the center of the under surface of the roof structure over each of the temperature regulating chambers.

On entering the passage 31, the outgoing cooling air will be directed by the upper portion 31c of the outlet passage into and through a port 33 or 34 to the cavity 32 in the upper part of the block 22. Air under pressure will move from disaligned ports at opposite ends of the cavity 32 to the middle portion thereof where a circulatory movement of outgoing air will be set up, all as indicated by direction arrows in one of the two cavities 32 shown in the left hand portion of Fig. 1. The corrugated or roughened character of the bottom of such cavity will retard the movement of the outgoing streams of air and aid in creating a condition of turbulence of the air in the zone of circulatory movement thereof. Air will pass upwardly from the cavity 32 through the final outlet or stack opening 40 in middle roof cover block 37 as indicated by direction arrows in Fig. 3.

The cooling wind may be shut off and heat may be supplied by use of the burner ports or tunnels of the burner blocks with which burner nozzles of a suitable fuel supply system, not shown, may be operatively associated. It will be noted from Fig. 3 that the lower portions of the blocks 21 project inwardly of the space above the stream of molten glass well beyond the inner ends of the burner blocks and thus will prevent cooling air from passing to the combustion area at the inner ends of the burner ports when cooling air is being used and also will prevent flames and products of combustion from the burner ports from moving into the cooling passages when the latter are not being used and the burners are in operation.

Because of the practically complete separation of the spaces above the glass in the successive temperature regulating chambers, temperature regulating effects may be produced which are designed to produce the most desirable end result in view of the conditions existing at a given time. Thus, for example, the heating provisions available in chamber 25 may be employed to heat the glass passing therebeneath to an extent sufficient to maintain or possibly increase the temperature of the bottom glass of the stream while the cooling provisions are inactive. In the succeeding chamber the top glass of the stream may be cooled. In this way, the combined effect of the two different temperature regulating treatments may thus have been predetermined suitably to provide a desirable, substantially uniform temperature throughout the cross-section of the glass stream leaving the cooling section of the forehearth.

The length of the cooling section may be selected by selection of the number of identical transverse superstructure sections and successive temperature regulating chambers, each with its heating and cooling wind provisions.

The flatly arched roof structures are based on cooler portions of the burner blocks, rather than on the hotter inner ends thereof. This tends to increase the useful life of such burner blocks.

By reason of its novel structure the cooling section of the invention has a high efficiency and is economical for use, whether for cooling or heating the glass of the stream in the forehearth or for cooling at one place and heating at another. The component blocks and elements of the same kind are interchangeable and only a comparatively few different kinds of such blocks are required for the construction of a complete cooling section.

Many changes in and modifications of the illustrative structure shown in the drawings and herein particularly described will now be obvious to those skilled in the art and I therefore do not wish to be limited to the details of such structure.

I claim:

1. In a cooling section of a forehearth for molten glass, a roof structure comprising a middle portion having an under surface and a pair of side portions, the side portions having transversely spaced inner side surfaces on lower portions thereof extending downwardly from opposite side edges of the under surface of the middle portion and coacting therewith to define a laterally confined space beneath said under surface, each of said roof structure side portions being provided with a series of alternating cooling air intake and exhaust passages having outlets and inlets, respectively, in the inner side surface of its lower portion close to the adjacent edge of the under surface of said roof structure middle portion.

2. In a cooling section of a forehearth for molten glass, a roof structure as specified by claim 1 wherein the relative positions of the alternating cooling air intake and exhaust passages in the respective roof structure side portions are reversed so that the inlets of the exhaust passages in the inner side surface of the lower portion of each of the roof structure side portions are approximately opposite the outlets of the cooling air intake passages in the other such inner side surface.

3. In a cooling section of a forehearth for molten glass, a roof structure as specified by claim 1, and, in combination therewith, a series of burner blocks operatively positioned beneath each of said roof structure side portions, the inner surfaces of said burner blocks being offset outwardly from the inner side surfaces of the lower portions of the overlying roof structure side portions.

4. In a cooling section of a forehearth for molten glass, a substantially horizontal refractory channel of U-shape in cross-section, said channel having upturned side walls for laterally confining a stream of molten glass therein, and a claywork superstructure on said channel comprising a series of transverse sections, each comprising a pair of opposed burner blocks respectively operatively disposed on the upturned side walls of said channel, a pair of opposed combination skewback and arch springer blocks respectively mounted on said opposed burner blocks, a key block disposed between and supported by upper portions of the opposed combination skewback and springer blocks so that a laterally confined cooling air space beneath said key block is defined by transversely spaced inner side surfaces of lower portions of said opposed combination blocks, said key block having a cavity in its upper surface provided with a pair of inlet grooves respectively extending through opposite side surfaces of the key block, each of said combination skewback and springer blocks being provided with a cooling air intake passage having an inlet in the top surface and an outlet in the inner side surface of the lower portion of said block and with an air exhaust passage having an inlet in the inner side surface of the lower portion of the block and an outlet in the inner side surface of the upper portion of said block in register and communication with the adjacent inlet groove to the cavity in the upper surface of the key block, and a cover block structure for the key block and combination skewback and springer blocks, said cover block structure having a final exhaust opening above and in communication with the cavity in the upper surface of the key block and also having other openings above and in register with the inlets of the cooling air intake passages in the top surfaces of the combination skewback and springer blocks.

5. In a cooling section of a forehearth for molten glass, a combination as specified by claim 4 wherein said burner blocks have burner ports extending therethrough from their outer to their inner end surfaces, and wherein said combination skewback and springer blocks project inwardly beyond the inner end surfaces of the underlying burner blocks and provide baffles between the inner ends of the burner ports and the outlets of the cooling air intake passages in the inner side surfaces of such combination blocks.

6. In a cooling section of a forehearth for molten glass, a combination as specified by claim 4, wherein said combination skewback and springer blocks bear on said burner blocks only at places spaced outwardly from the normally hotter inner end portions of such blocks.

7. In a cooling section of a forehearth for molten glass, a combination as specified by claim 4 and, in addition, transverse refractory baffle members extending across the space above the refractory channel between pluralities of said transverse sections of the claywork superstructure so as to divide said space into a plurality of successive separate temperature regulating chambers.

8. In a cooling section of a molten glass forehearth having a substantially horizontal refractory channel of U-shape in cross-section and formed with upturned side walls for laterally confining between them a stream of molten glass in the channel and a series of pairs of opposed burner blocks respectively disposed on the side walls of the refractory channel, a claywork superstructure comprising a series of transverse sections each comprising a pair of opposed combination springer and skewback blocks, each mounted on the corresponding one of a pair of opposed underlying burner blocks and a key block supported between upper portions only of the opposed combination springer and skewback blocks, each of said combination springer and skewback blocks having a cooling air intake passage and an exhaust air passage formed therein in a side-by-side relation, the intake passage having a final end portion opening through the inner surface of the lower portion of the block beneath the key block and having an initial end portion opening through the top of the block, said key block having a cavity in its top provided with grooves opening through the side walls of the block abutting the upper portions of the combination springer and skewback blocks, the exhaust passages in the latter blocks being of approximate C-shape and each comprising an initial end portion opening through the inner wall of the lower portion of its block beneath the key block and an upper final end portion opening into the groove in the adjacent side of the key block, and a cover block structure for the key block and pair of combination springer and skewback blocks, said cover block structure having a final exhaust opening communicating with and located above the center of the cavity in the key block and having other openings providing inlets to the initial portions of the cooling air intake passages.

9. In a cooling section of a molten glass forehearth having a substantially horizontal refractory channel of U-shape in cross-section, burner blocks thereon, and a claywork superstructure as specified by claim 8, the component blocks of said superstructure being provided with mating projections and recesses in abutting portions thereof adjacent to their outer surfaces to miminize escape of heat from the interior and infiltration of air thereto from the ambient atmosphere.

10. In a cooling section of a molten glass forehearth having a substantially horizontal refractory channel of U-shape in cross-section, burner blocks thereon, and a claywork superstructure as specified by claim 8, the key block of each of the transverse sections having a slightly arched under surface so as to tend to create turbulence at its middle area of jets or streams of air scrubbing against said under surface in passing from the cooling air intake passages to the approximately opposite air exhaust passages.

11. In a cooling section of a molten glass forehearth having a substantially horizontal refractory channel of U-shape in cross-section, burner blocks thereon, and a claywork superstructure as specified by claim 8, the key block of each of the transverse sections having the inlet grooves at the opposite ends of the cavity in the top surface of such block located out of line with each other and the bottom of said cavity being corrugated between said grooves 12. A combination springer and skewback block for use in an arched roof structure of a cooling section of a forehearth for molten glass, said block being formed with a substantially flat horizontal supporting bottom surface extending from the outer surface of the block for approximately half the distance to its inner surface and with a flat upper surface parallel with said flat bottom surface portion, the remainder of the bottom surface of the block being inclined upwardly toward the inner surface of the block, said block having an inner surface formed with a substantially vertical lower portion and with an outwardly inclined upper portion, said block also having a substantially C-shaped passage formed in the block with the ends thereof opening through the lower and upper portions respectively of the inner surface of the block and with a second passage of approximate L-shape formed in the block to open at one end through the lower portion of the inner surface of the block and to open at its other end through the top surface of the block.

13. A block as specified by claim 12 provided with a vertically extending sealing rib on one side thereof adjacent to said outer surface and with a similarly located vertical recess in its opposite side adapted to receive the sealing rib of an adjacent like block.

14. A block as specified by claim 12 provided with a horizontal notch extending along the upper part of the inner surface of the block.

15. A refractory block for use as the key block in an arched transverse roof section of a cooling section of a forehearth for molten glass, said block having a cavity in its top extending for the greater part of the width and length of the block and being provided with a pair of grooves respectively extending through the opposite side surfaces of the block at diagonally opposite corner portions of the cavity, said block having its opposite side surfaces formed with outwardly projecting or offset portions extending along the upper edge of the block.

References Cited in the file of this patent
UNITED STATES PATENTS
2,144,973    Honiss _____ Jan. 24, 1939